United States Patent [19]

Koltuniak et al.

[11] 3,749,981

[45] July 31, 1973

[54] MODULAR POWER SUPPLY WITH INDIRECT WATER COOLING

[75] Inventors: Michael A. Koltuniak, Warren; Thomas N. Urquhart; Leo L. Case, both of Troy, all of Mich.

[73] Assignee: Controlled Power Corporation, Farmington, Mich.

[22] Filed: Aug. 23, 1971

[21] Appl. No.: 173,955

Related U.S. Application Data

[63] Continuation-in-part of Ser. No. 66,266, Aug. 24, 1970, abandoned.

[52] U.S. Cl. .............. 317/100, 174/15 R, 165/107, 62/414

[51] Int. Cl. .............. H02b 1/18

[58] Field of Search .............. 62/414, 418; 174/15 R, 16 R, DIG. 5; 317/100; 165/107

[56] References Cited

UNITED STATES PATENTS

| | | | |
|---|---|---|---|
| 3,396,780 | 8/1968 | Koltuniak | 174/16 R |
| 3,387,648 | 6/1968 | Ward | 174/15 R |
| 3,132,288 | 5/1964 | Talentinow | 317/100 |

*Primary Examiner*—Robert K. Schaefer
*Assistant Examiner*—Gerald P. Tolin
*Attorney*—Barnes, Kisselle, Raisch & Choate

[57] ABSTRACT

A modular power supply for converting alternating current to direct current for high power applications wherein the power modules are mounted inside a sealed cabinet and each module has its own fans to cool transformers and rectifiers therein. Also mounted inside the cabinet are cooling modules, each of which has its own fan and heat exchanger. Hot air from the power module outlets is cooled by the cooling modules and returned to the power module inlets. The capacity of the cooling modules is selected so that substantially atmospheric pressure exists in the cabinet at the power module inlets and outlets and so that the combined air flow through the cooling modules is substantially equal to the combined air flow through the power modules.

27 Claims, 12 Drawing Figures

INVENTORS
MICHAEL A. KOLTUNIAK
THOMAS N. URQUHART
LEO L. CASE
BY
Barnes, Kisselle, Raisch & Choate
ATTORNEYS INVENTORS
MICHAEL A. KOLTUNIAK
THOMAS N. URQUHART
LEO L. CASE
BY
Barnes, Kisselle, Raisch & Choate
ATTORNEYS

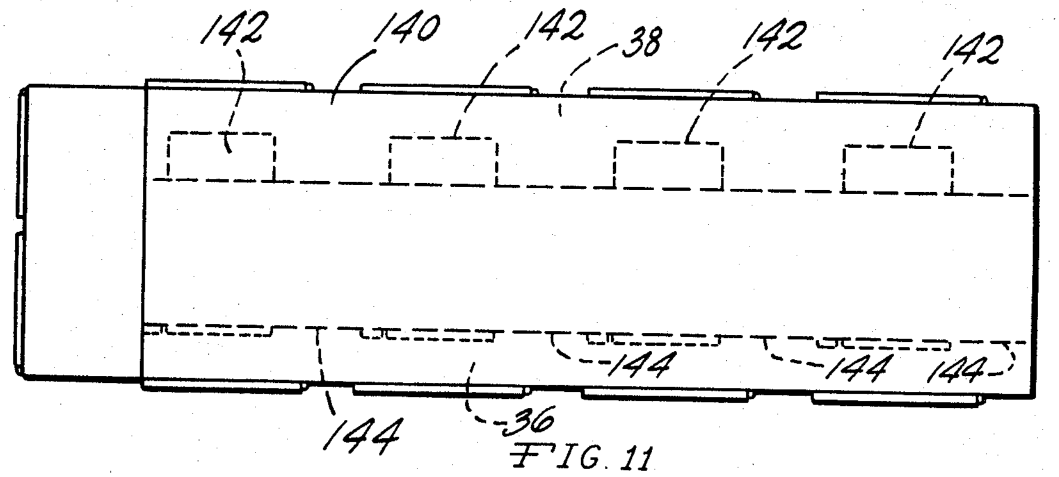
FIG. 11
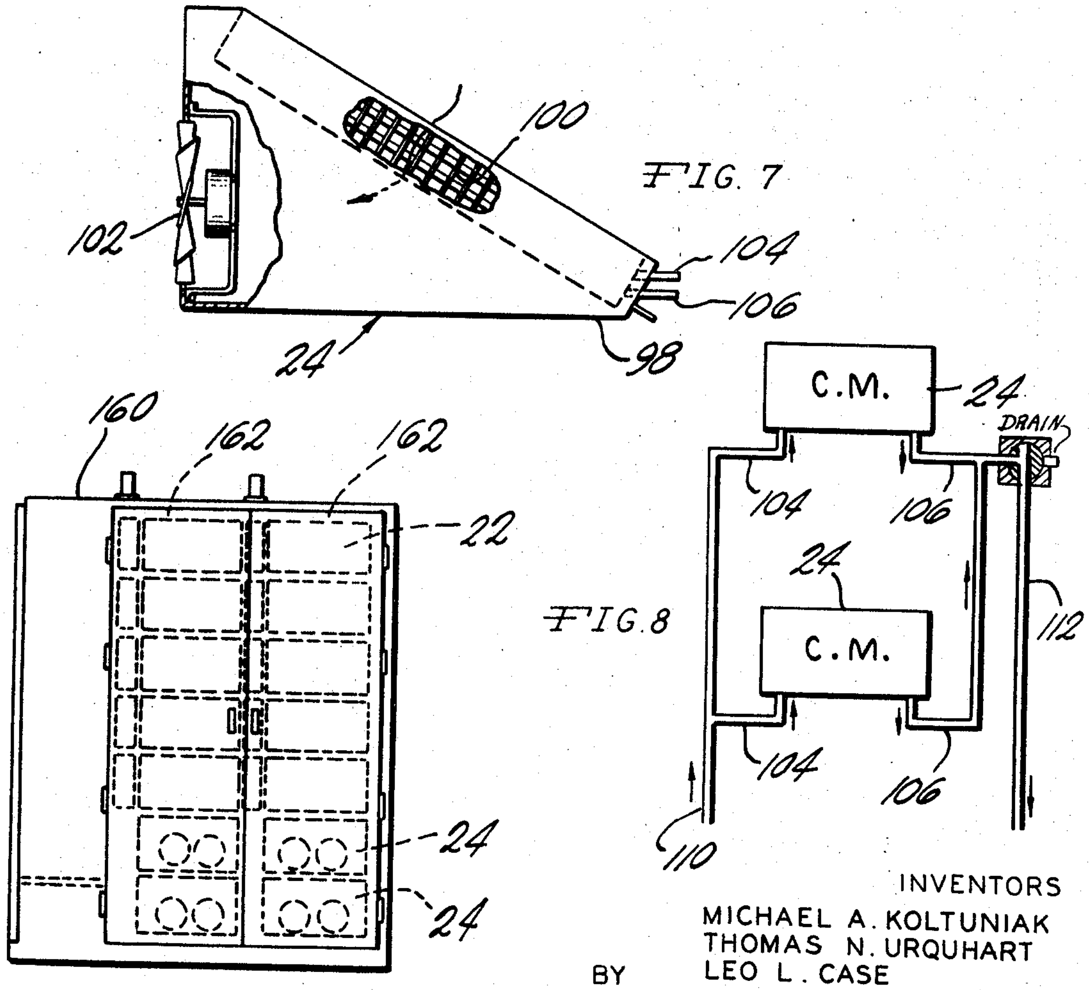
FIG. 7, FIG. 8
FIG. 12
INVENTORS
MICHAEL A. KOLTUNIAK
THOMAS N. URQUHART
LEO L. CASE
BY
Barnes, Kisselle, Raisch & Choate
ATTORNEYS

INVENTORS
MICHAEL A. KOLTUNIAK
THOMAS N. URQUHART
LEO L. CASE

BY

Barnes, Kisselle, Raisch & Choate
ATTORNEYS

MODULAR POWER SUPPLY WITH INDIRECT WATER COOLING

This application is a continuation-in-part of our copending application Ser. No. 66,266, filed Aug. 24, 1970, and entitled "Modular Power Supply With Indirect Water Cooling."

Copending applications Ser. No. 9,294, filed Feb. 6, 1970, entitled "Modular Alternating to Direct Current Converter," and Ser. No. 9,331, filed Feb. 6, 1970, entitled "Modular Power Supply," disclose modular power supplies for converting three-phase alternating current to direct current for high power applications. These modular power supplies provide reliability, flexibility and expandability for a wide variety of different DC power requirements. The modular power supply simplifies shipping, handling, installation and repair and is lightweight and compact by comparison with prior art power supplies.

The power supplies disclosed in the aforementioned copending applications use fans in each module for direct air cooling of the electrical components therein. With direct air cooling, air is drawn into the modules from the environment in which the power supply is located and exhausted into the same environment. For most applications, direct air cooling is satisfactory. Effective cooling within each module and uniform cooling as between modules is obtained because the air flow rate through each module is determined by that module's individual fans. Cooling air is drawn through the module so that the air first cools rectifier sinks and then a transformer before being exhausted at the rear of the module. Inlet and outlet grills on each module have relatively large areas so that a large volume of air can be moved through a bank of modules at a low velocity providing quiet operation by comparison to many prior art rectifiers. Horizontal air flow from the front to the rear of the modules as contrasted to vertical air flow used in certain prior art devices will be cleaner and less likely to create dust in the environment in which the power supply is being used.

Aside from the advantages offered by the direct air cooling in the aforementioned power supplies, a modular power supply has numerous other advantages. A complete power supply can be built up from inventory modules to meet practically any power requirement by merely using the appropriate number of modules. A customer anticipating large future power requirements can purchase a power supply with the necessary modules to meet present power demands and then add additional modules as his demand increases. The system is very reliable and extra modules can be kept on hand by the customer to eliminate down time in the event of a failure at one of the modules.

For certain applications, direct air cooling may be undesirable. If the power supply is being used with certain coating processes that generate fumes having a corrosive action on the electrical components, the direct air cooled power supply must be located away from the contaminated environment. With prior art power supplies, the contaminated air problem has been approached by at least two techniques. With one type of prior art power supply having a single massive transformer, the transformer is enclosed in a large housing and a central blower is used to circulate air over the transformer, other electrical components in the housing and a heat exchanger. This technique is sometimes referred to as indirect water cooling where water is used to cool the air at the heat exchanger. Another proposed solution to the contaminated air problem is direct water cooling by circulating cooling water directly through the electrical components, e.g., through the transformer core and diode heat sinks.

With prior art indirect water cooled power supplies, the customer may not be able to purchase a power supply tailored to his requirements or else he must buy a custom installation. The single transformer and its associated diode rectifiers and controls must then be designed to meet a specific power requirement. The cabinet configuration, blower requirements and the location of the rectifiers and the transformer in the cabinet have to be engineered to obtain the desired air circulation and cooling. Where a single central blower is used to circulate air over the water cooled coils and over the electrical components, a negative pressure zone is present at the inlet of the blower. This negative pressure zone will draw contaminated air into the housing unless adequate seals are used. The problem is accentuated when over capacity blowers are used to assure sufficient air flow over the electrical components. Direct water cooling systems can be designed for efficient water cooling but they are expensive and require different designs for different power requirements. Where tap water is used in direct contact with the electrical components, over a period of time deposits build up inside the electrical components and decrease the effectiveness of the water cooling. If there is a failure in the direct water cooled system, the entire power supply must be shut down.

The objects of the present invention are to provide a DC power supply and cooling system therefor that overcome the aforementioned disadvantages of prior art direct air and indirect water cooled systems.

Further objects of the present invention are to provide a DC power supply having indirect water cooling that is reliable and is expandable for different DC power supply requirements; that simplifies manufacturing, inventory, shipping, handling, installation and repair; that provides effective indirect water cooling while permitting operation of the power supply with direct air cooling where required without impairing the cooling required by the power supply; that achieves effective cooling air distribution through all of the rectifier components; and/or that operates effectively with modular power supplies of the type where each power module has its own cooling fan.

Other objects, features and advantages of the present invention will become apparent in connection with the following description, the appended claims and the accompanying drawings in which:

FIG. 7 is a side elevational view of the cooling module used in the power supply of FIG. 1;

FIG. 8 is a schematic diagram of cooling water connections to two parallel cooling modules;

FIG. 11 is a top view of another modification of the present invention; and

FIG. 12 is a front elevational view of a still further modification of the present invention.

Figure 2:
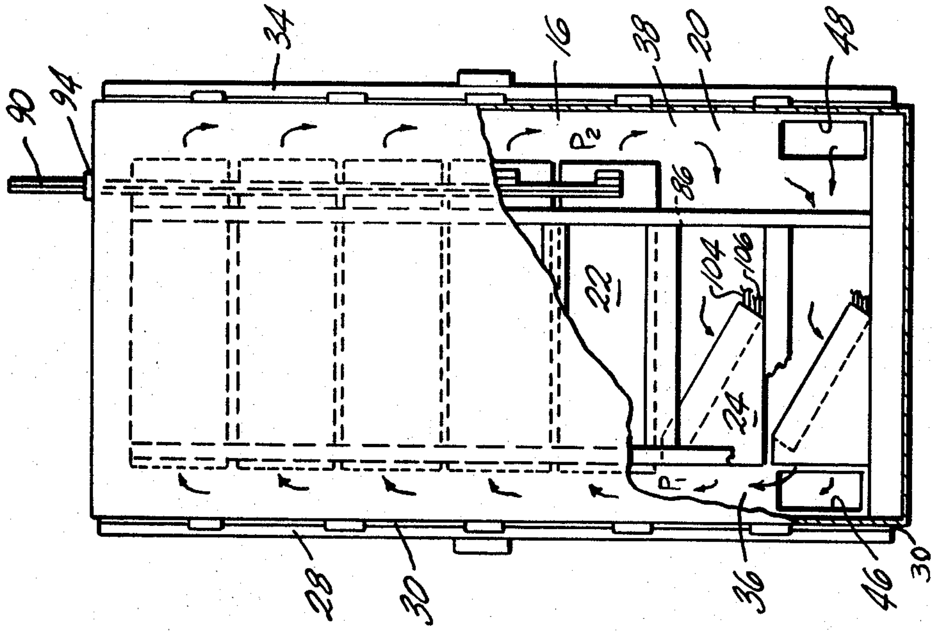
FIG. 2 is a side view of the power supply of FIG. 1 with a portion of the cabinet broken away and certain parts shown in hidden lines.

Referring in greater detail to the modular power supply shown in FIGS. 1–4, an exterior cabinet 14 has a vertical partition 16 that divides cabinet 14 into a control chamber 18 and a power module chamber 20. Five rectifier modules 22 are mounted on cabinet 14 in chamber 20 in a vertically stacked column. Two cooling modules 24 are also mounted in chamber 20 below and in stacked vertical alignment with the power modules 22. Chamber 20 has a front access opening 26 that extends throughout the full height and width of the stacked modules 22, 24. The front opening 26 is closed by a front door 28 having an inside peripheral gasket 30 so that when door 28 is closed the opening 26 is substantially dust tight and, as will later be described in greater detail, substantially air tight in the sense that little, if any, air is exchanged between the interior and exterior of the cabinet 14 during normal operation. Similarly, chamber 20 has a rear opening 32 that extends throughout the full height and width of the stacked modules 22, 24 and is closed by a gasketed door 34. The modules 22, 24 are spaced inwardly of the front door 28 with the space therebetween defining a cool air portion 36. The modules 22, 24 are also spaced forwardly of the rear door 28 with the space therebetween forming a warm air chamber portion 38.

Chamber 18 has a side access opening 40 that extends substantially the full height and depth of cabinet 14 and is sealed by gasketed doors 42. A horizontal partition 43 in the lower portion of chamber 18 forms an air-tight compartment 45 in which an SCR module 44 is mounted. Module 44 includes a fan 120 and six silicon controlled rectifiers in a duty cycle controller 47 that feeds modules 22. Chamber 18 may also include other electrical control components, such as relays and disconnect switches, etc., mounted above the SCR module 44. Compartment 45 communicates with the cool air portion 36 of chamber 20 through an aperture 46 at the front lower corner of partition 16 and with warm air chamber portion 38 through an aperture 48.

Each of the power modules 22 (FIGS. 5 and 6) generally comprises a pair of upper corner extrusions 54, a pair of bottom corner extrusions 56, top and bottom panels 58, 60, a pair of sides 62, 64 and front and rear grills 66, 68. The top and bottom panels 58, 60 and sides 62, 64 are assembled on corners 54, 56 so that the modules 22 have a generally rectangular transverse cross section. Corners 54, 56, panels 58, 60 and sides 62, 64 extend the full length of the modules 22 between the front grill 66 and the rear grill 68 so that the module is substantially closed except at the grills. At the front of each module 22 are two heat sinks 70, each of which is mounted on a respective bus bar 72, 73 forming part of the respective sides 62, 64. In the preferred embodiment, modules 22 are three-phase, alternating-to-direct current converters and three diodes 74 are mounted on each of the heat sinks 70. In the center portion of each module 22 is a three-phase transformer 76 mounted on corners 54, 56 by transformer brackets 78. A pair of fan motors 80 each with its respective fan blade 82 are mounted at the rear of each module 22. Fans 82 draw cool air from chamber portion 36 through the front grill 66 over the heat sinks 70 and then the transformer 76 and exhaust heated air through rear grill 68 into the warm air chamber portion 38. The lower corners 56 have laterally outwardly projecting flanges that are slidable on channels 84 which in turn are fastened on uprights 86. Each module is electrically interconnected with an associated circuit breaker 88 by wiring (not shown) to supply current to transformer 76 and motors 80. Diodes 74 are connected in a conventional three-phase bridge rectifier configuration so that one DC polarity is developed at bus 72 and the opposite DC polarity is at bus 73. The DC output of the modules 22 is collected in parallel by bussing 90, 92 electrically connected to the respective buses 72, 73 at the rear end of modules 22. Bussing 90, 92 extends vertically and passes outwardly through the housing at insulated seals 94. A module 22 is easily removed from cabinet 14 by disconnecting it from its circuit breaker 88 and bussing 90, 92 and then sliding the module out of the cabinet.

Each of the cooling modules 24 generally comprises a sheet metal housing 98 in which a finned heat exchanger 100 (FIG. 7) is mounted at the warm air inlet and a pair of motor-driven fans 102 are mounted at the cool air outlet. Fans 102 are mounted in suitable apertures in the front panel of housing 98 with suitable electrical connections (not shown). The front, back, bottom and sides of housing 98 are closed except for the openings at fans 102 and heat exchanger 100. Heat exchanger 100 is rectangular in plan view and is mounted in housing 98 at about 30° to the bottom of the housing to reduce the vertical dimension, as illustrated in FIG. 7, of the module 24. However, other configurations of heat exchangers having the cooling capacity required could also be used. Each heat exchanger 100 has inlet and outlet connections 104, 106 for circulating cooling water through the heat exchanger. Inlets 104 are connected to a supply pipe 110 and outlets 106 are connected to an outlet pipe 112 in the "reverse-return" arrangement illustrated in FIG. 8. The inlet and outlet pipes 110, 112 pass through the side of cabinet 14 for connection to a suitable supply of cooling fluid (not shown). The fluid paths through pipes 110, 112 and modules 24 are made the same length for each module to balance the flow through the parallel modules. In one embodiment of the present invention, the cooling fluid is tap water at approximately 85° F, but other sources of cooling fluid at other temperatures can also be used.

Referring back to FIG. 2, when fans 82 in the power modules 22 and fans 102 in the cooling modules 24 are energized, air will be circulated in chamber 20 in the manner generally indicated by the arrows in FIG. 2. Fans 102 draw warm air from the warm air chamber portion 38 through heat exchangers 100 and exhaust cool air into the cool air portion 36. Fans 82 draw cool air from the cool air portion 36 over the electrical components and exhaust warm air into the warm air into the warm air chamber 38. SCR module 44 is provided with its own fans 120 so that some of the cool air is drawn through aperture 46 and module 44 and exhausted into the warm air chamber portion 38 through aperture 48.

According to one important aspect of the present invention, the air flow rate through each of the power modules 22 is determined primarily by the capacity of the fans 82 associated with each module. To achieve interchangeability between the power modules 22 in the indirect water cooled power supply being described and the direct air cooled power supply disclosed in the aforementioned copending applications, the fans 82 are selected to provide an air flow rate required to adequately cool rectifiers 70 and transformer 76 under conditions of atmospheric pressure at the front and rear grills 66, 68 and typical ambient temperatures. The combined air flow rate through the two cooling modules 24 is approximately balanced with the combined air flow rates required by the five power modules 22 and the SCR module 44 so that the pressures $P_1$ in chamber 36 and $P_2$ in chamber 38 are at atmospheric pressure.

It should be noted that the power modules 22 are mounted on the uprights 86 with a slight vertical spacing 124 therebetween communicating between the cool and warm air chamber portions 36, 38. In the preferred embodiment, the air flow rate through the modules 24 is slightly greater than the air flow rate through modules 22, 24. However, pressure equalization between the chambers 36, 38 occurs by air flow through the spaces 124. The areas of grills 66, 68 are relatively large so that the required flow rate is achieved at relatively low velocities. Similarly, the air is moved through cooling modules 22 and the chamber portions 36, 38 at a relatively low velocity. The highest negative pressure due to fans 82 is located just upstream of the fans 82, i.e., to the left of the fans as viewed in FIG. 6. However, because the negative pressure zone is inside the module 22, fans 82 cause little, if any, pressure differential between the interior and exterior of the cabinet 14. Similarly, because the highest negative pressure due to fans 102 is inside the modules 24 just upstream of the fans, i.e., to the right of the fans as viewed in FIG. 7, fans 102 cause little, if any, pressure differential between the interior and exterior of the cabinet 14. Stated differently, the capacity of fans 82, 102 is just slightly greater than that required to overcome the air flow resistance through the associated module at the air flow rate required. For one embodiment of the present invention, a maximum pressure differential of 0.1 to 0.15 inch of water occurred inside the cooling modules 24. The highest pressure differential between the interior and exterior of the cabinet was approximately 0.05 inch of water which, for all practical purposes, means that the cabinet is nominally at atmospheric pressure.

By operating the closed system with substantially atmospheric pressure in the cool and warm air chamber portions 36, 38, several important advantages are achieved. The modular power supply with indirect water cooling described hereinabove retains the advantages of the direct air cooled power supply described in the aforementioned copending applications and, at relatively low cost, provides the additional capability of indirect water cooling. Symmetrical air flow as between the different power modules 22 is retained because the air flow to each module is still determined by the capacity of the fans 82 in the respective module 22. One of the modules 22 will not rob cool air from the other power modules. There is very little, if any, pressure differential between the interior and exterior of the cabinet 14 tending to draw contaminated air into the interior of the cabinet 14. Hence effective seals can be provided by relatively simple gaskets at the doors 28, 34, 42 and other entry openings into the interior of cabinet 14 as at the bussing 90, 92 and the cooling fluid pipes 110, 112. The capacity of the cooling modules 24 may be selected so that effective cooling at the power modules 22 is achieved with tap water at 85° F circulated through the heat exchanger 100. With larger power supplies (more power modules 22), the ratio of power modules to cooling modules can bee increased when chilled water at say 45° F is available. The power supply described hereinabove can be operated with direct air cooling by merely opening both the front and rear doors 28, 34. Hence a purchaser can buy the unit without cooling modules and use direct air cooling and still have the capability to add indirect water cooling as desired. Even in a contaminated environment, in the event of failure of the water supply the power supply could be operated for a short period of time as a direct air cooled system. Since cooling water circulates only through the exchangers 100, when deposits built up over an extended period, it is only necessary to replace the heat exchanger. A defective cooling module can be replaced easily. Most importantly, the use of standardized cooling modules provides flexibility and expandability to meet different power requirements as will be more apparent by reference to the further embodiments in FIGS. 9–12.

Figure 9:
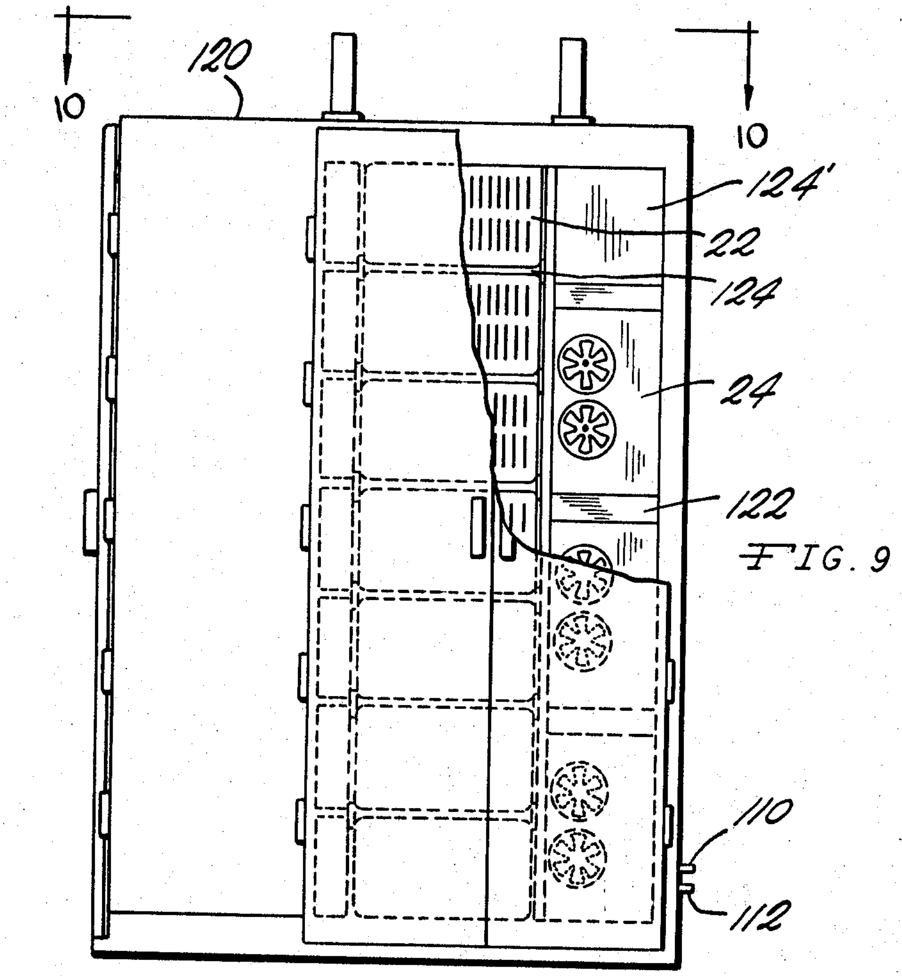
FIG. 9 is a front elevational view of a modified power supply of the present invention with a portion of the cabinet broken away and certain parts shown in hidden lines.
Figure 10:
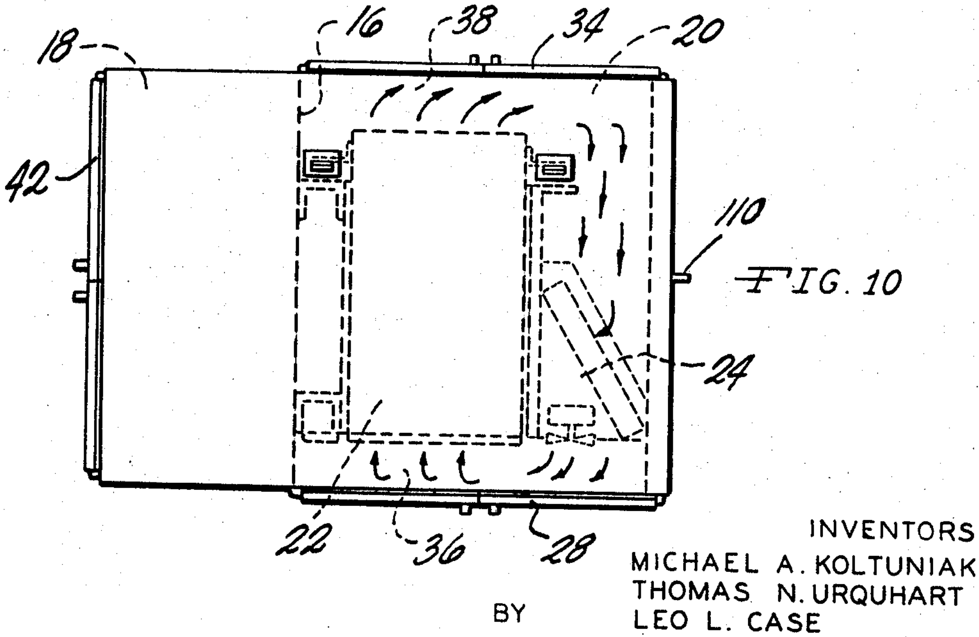
FIG. 10 is a top plan view of the power supply of FIG. 9.

Referring to the modification illustrated in FIGS. 9 and 10, the cabinet 120 is substantially the same as the cabinet 14 (FIGS. 1–4) except that it is wider to accommodate a vertical stack of seven power modules 22 and three cooling modules 24 stacked vertically side-by-side as contrasted to the arrangement illustrated in FIGS. 1–4. Since the power supply shown in FIGS. 9 and 10 is similar in many respects to that shown in FIGS. 1–4, similar components will be identified by like reference numerals. Cabinet 120 is divided into a control chamber 18 and a power module chamber 20 by a vertical partition 26. The chamber 18 is closed by gasketed doors 42 whereas the chamber 20 is closed by front and rear doors 28 and 34, respectively. For purposes of illustration, doors 24 and 34 are illustrated as double doors although the single doors shown in FIGS. 1–4 could also be used. The control chamber 18 includes the SCR module 44 that is cooled by circulation through a suitable aperture in the partition 26 as described in greater detail in connection with FIGS. 1–4. The seven modules 22 are slideably mounted on uprights 86 in the same manner described for modules 22 in FIGS. 1–4. The lower two additional power modules 22 in FIG. 9 are inserted in place of the cooling modules 24 illustrated in FIGS. 1–4. The increased width of cabinet 120 accommodates the three cooling modules 24 that are mounted in any convenient manner as by horizontal shelves 122 on the cabinet 120. Since the power modules 22 and the cooling modules 24 illustrated in FIG. 9 are identical to the corresponding modules 22, 24 in FIGS. 1–4, the vertical dimension of the module 24 in the position illustrated in FIG. 9 is the horizontal width dimension of the module when disposed as viewed in FIGS. 1–4. When the modules 24 are tipped on their sides for vertical orientation in a separate column as illustrated in FIGS. 9 and 10, the vertical height occupied by the modules 24 may not entirely fill the space provided by the additional width of the cabinet 120. The excess space may be closed by a suitable panel 124.

With the cooling modules 24 resting on their sides by contrast to the disposition in FIGS. 1–4, it will be apparent that the air circulation in the cabinet 120 differs slightly from that illustrated in connection with FIGS. 1–4. Hence in FIGS. 9 and 10, the air is exhausted rearwardly of modules 22 into the warm air chamber portion 38 where it circulates in a generally horizontal direction, i.e., in a clockwise direction as viewed in FIG. 10, to the warm air inlet at the heat exchanger 100 of the cooling module 24. The cooling module fans 102 draw the warm air from the warm air chamber portion 38 through the heat exchanger 100 and exhaust cool air at the cool air chamber portion 36 at the front of cabinet 120. With the embodiment of FIGS. 9 and 10, the pressure in the two chamber portions 36, 38 is equalized at atmospheric pressure by proper selection of the air flow rates through modules 22 and modules 24 and by the vertical space 124 between modules 22. Where the capacity of two cooling modules 24 is selected to supply the demand of five power modules and one control module 22, 24 (FIGS. 1–4), three of the same cooling modules will meet demands of seven power modules 22 and one SCR module in the arrangement shown in FIG. 9 with pressure equalization occurring by greater air flow through the spaces 124.

By way of further example of the present invention, FIG. 11 is a top plan view of a further modification wherein the width of the cabinet 140 is increased to accommodate 28 power modules 22. Power modules 22 are arranged in four spaced vertical stacks 142 with seven power modules 22 in each stack. In the horizontal space between the adjacent stacks of power modules 142, there are four vertical stacks 144 of three cooling modules 24 each. Each pair of module stacks 142, 144 are substantially the same as that illustrated in FIG. 9. Uniform distribution of cooling air between the power modules 22 and the cooling modules 24 is obtained because the demands of individual power modules 22 and cooling modules 24 are met by their respective fans.

Referring to FIG. 12, a further embodiment of the present invention is illustrated wherein the cabinet 160 has its width selected to accommodate two vertical stacks 162 with each stack having 5 power modules 22 and two cooling modules 24. In the embodiments illustrated in FIG. 12, as with the other embodiments described, all of the power modules 22 exhaust warm air into a common warm air chamber portion of the cabinet 160 generally corresponding to the common warm air portion 38 in FIGS. 1–4, 10 and 11 and take in cold air from a common cool air chamber portion corresponding to cool air chamber portion 36 in FIGS. 1–4, 10 and 11. Uniform and symmetrical distribution of the air between the power modules 22 and the cooling modules 24 is achieved by the individual fans in the power and cooling modules.

Although the invention has been described herein for specific embodiments, numerous other modifications are also contemplated. Although the cooling modules 24 have been described as individual units with individual housings 98, the present invention also contemplates integrated cooling modules where one or more of the corresponding walls of the cooling modules are formed by partitions in the cabinet. It will also be apparent that although a particular configuration is illustrated in FIG. 7 for the heat exchanger 100, other configurations can also be used, for example, to facilitate draining cooling fluid from the modules depending on whether the modules are oriented in the aligned arrangement of FIGS. 1 and 2 or in the side-by-side arrangement of FIGS. 9 and 10. As indicated earlier, the number of cooling modules required can be varied depending on the cooling water temperature. If in a given arrangement such as illustrated in FIG. 9 seven power modules require three cooling modules with tap water at 85°F, adequate cooling could be obtained with fewer modules, for example, two modules operating with chilled water at 45°F. Cooling modules having self-contained refrigeration units could be used but the less expensive, simpler and more reliable arrangement using tap water or chilled water from an external source is preferred for most applications. Because the fans for circulating the air are distributed, as contrasted to central blower, warm air and cool air chambers common with all of the modules can be used. The air flow rate through the modules, individually and collectively, can be varied using different fan blades and/or fan motors. The relatively small propeller blades, as contrasted to a central blower, provide a compact arrangement. The modules can be arranged to also utilize natural convection. For example, two cooling modules could be used above five power modules, rather than the opposite arrangement of FIG. 1, to take advantage of natural convection.

From the various embodiments of the present invention described hereinabove, it will be apparent that the indirect water cooling achieved by the use of the cooling modules 24 provides flexibility, versatility, expandability and reliability in design, installation, maintenance and operation. Dirt and corrosive fumes are kept out of the power modules and there is no outside air movement to raise dust in the working area. The power supply can be located at the work area regardless of contamination and this in turn may reduce the length of bussing between the power supply and the load. Power modules and cooling modules can be built and inventoried and later assembled in a selected housing depending on the power requirements of the customer. A customer could purchase a cabinet for more modules than actually required at the time of purchase and, when his power demands increase, merely add more power modules and additional cooling modules. A customer can also purchase the system without the cooling modules and operate by direct air cooling with the front, rear and side doors 28, 34, 42 removed or left open. Then when his demands require indirect water cooling, the cooling modules can be purchased and installed in the cabinet. Down time of the power supply is minimized because if failure occurs at any one cooling module, the module is merely removed and a new module inserted in its place. The ratio of power modules to cooling modules in the range of from seven-to-three to five-to-two, as illustrated herein, is preferred for compatibility with a basic seven-module stack without requiring any modification of the modules. Typically, the individual power modules are available for a wide range of output voltage requirements, for example, from 1,000 amps at 12 volts up to 62 amps at 3,000 volts. For many of these applications, the same modules could also be used at a ratio in the range of from two power modules for each cooling module up to three power modules for each cooling module.

Figure 1:
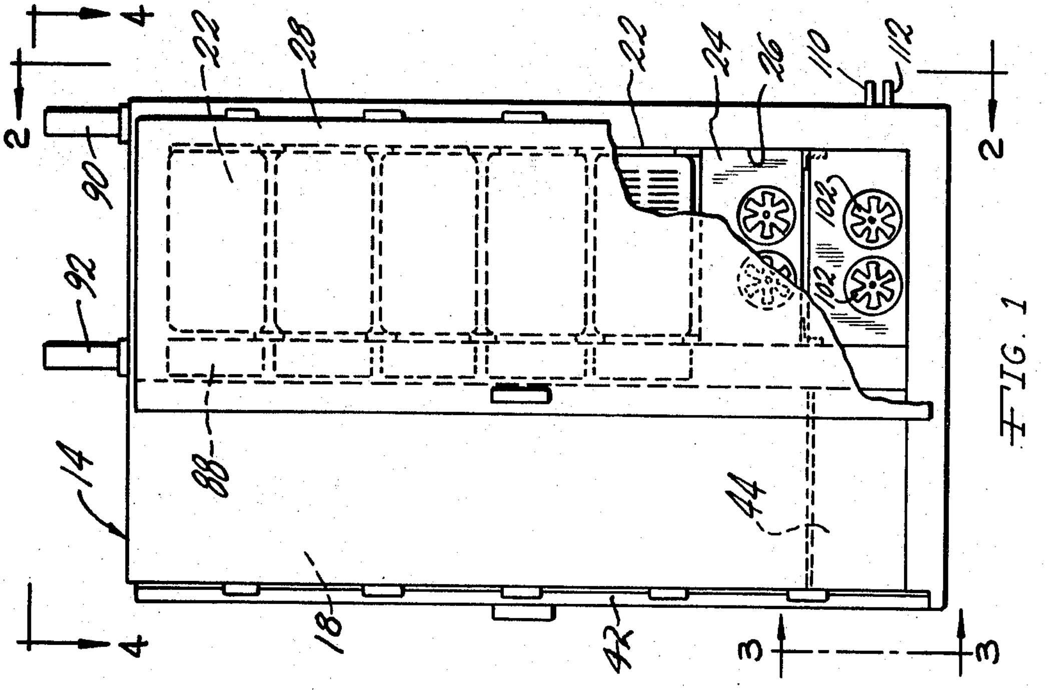
FIG. 1 is a front elevational view of a modular power supply having indirect water cooling with a portion of the front door broken away and certain parts shown in hidden lines to illustrate the cooling and power modules inside the cabinet.
Figures 3, 4, 5, 6:
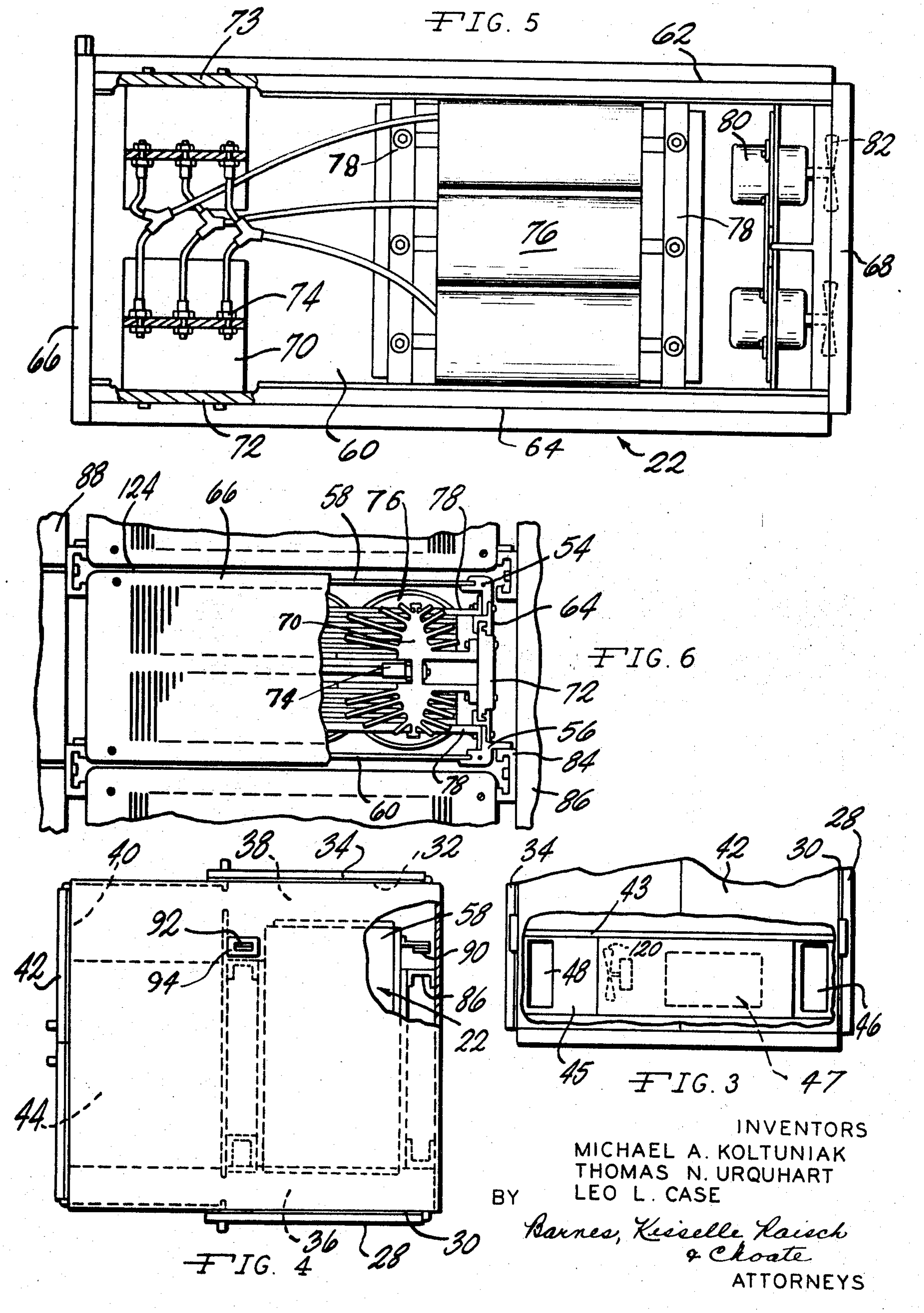
FIG. 3 is a fragmentary vertical section of a control cabinet chamber taken on line 3—3 of FIG. 2.
FIG. 4 is a top plan view of the unit of FIG. 1 with a portion of the cabinet broken away.
FIG. 5 is a top view of one power module used in the power supply of FIG. 1.
FIG. 6 is a front view of the power module of FIG. 5 with a fragmentary showing of adjacent parts.

As indicated earlier, the present invention contemplates simple gaskets at doors 28, 34, 42 and other openings in cabinet 14 as at busses 90, 92 and the cooling fluid pipes 110, 112. However, the extent to which the cabinet, for example, cabinet 14 of FIG. 1, is sealed and the construction of the gaskets will depend in part on the application, the degree of environmental contamination and the type of contamination, e.g., whether corrosive fumes or particulate contamination. The degree of sealing of cabinet 14 will also depend in part on the degree to which the modular cooling system is balanced. Where the air flow rate through the cooling modules is perfectly balanced with the air flow rate through the power modules and the modules are arranged so that a nominal pressure drop exists between the cooling module outlets and the power module inlets and between the power module outlets and the cooling module inlets, as a practical matter no air would be exchanged between the interior and exterior of the cabinet. Since a perfectly balanced system for different power module-to-cooling module ratios may not be commercially practical, effective operation can be achieved with a substantially balanced cooling system and a substantially closed cabinet so that, with reference to the embodiment of FIG. 1, for example, air in cabinet 14 is circulated from the cool air chamber 36 through the power modules 22 by their respective fans 80 and then to the warm air chamber 38 and then from the warm air chamber 38 through the cooling modules 24 and back to the cool air chamber 36 by the respective fans 120 without drawing any substantial quantity of air into cabinet 14 from the ambient environment. Hence for most applications, cabinet 14 can have a "dust-tight" seal, as known in the electrical enclosing trade, provided by simple rubber or polyurethane gaskets. In a practical commercial modular power supply, some exchange of air between the interior and exterior of cabinet 14 can be tolerated. When operating in a corrosive environment over a long period, corrosion and accompanying deterioration of components within the cabinet will be greatly reduced as compared to direct air cooling of power modules where cooling air is drawn into the modules directly from the ambient environment. Hence with a substantially balanced cooling system, a number of the advantages of the present invention could be obtained with cabinet seals, for example, at doors 28, 34, 42, that are metal-to-metal seals, although a simple gasket is preferred for most commercial applications.

Although a cooling system operating at atmospheric pressure within the cabinet has been described as the preferred embodiment, the present invention also contemplates a modular power supply with a substantially balanced modular cooling system as described hereinabove but operating at a slight positive pressure within the cabinet. For example, referring to the embodiment illustrated in FIGS. 1 and 2, air could be ducted into cabinet 14 from a clean remote environment by a small fan and inexpensive ducting to provide a substantially uniform, slight positive pressure within chambers 36, 38. Such a positive pressure system would permit air to leak from the interior of cabinet 14 to the ambient environment but prevent contaminated air from being drawn into cabinet 14 from the ambient environment.

It will be understood that the modular power supplies with indirect water cooling have been described hereinabove for purposes of illustration and are not intended to indicate limits of the present invention, the scope of which is defined by the following claims.

We claim:

1. A power supply for converting alternating current to direct current comprising a plurality of power modules each of which includes at least a transformer component and a rectifier component, exterior cabinet means, and at least one cooling module, each of said power modules having a cool air inlet, a warm air outlet and an air flow path therethrough from said inlet to said outlet, respective power module fan means in each power module to establish air flow therethrough, said components being disposed in said air flow path, and wherein said power modules are mounted in said cabinet means with said inlets communicating with a common cool air chamber in said cabinet means and said outlets communicating with a common warm air chamber in said cabinet means, said cooling module having a warm air inlet, a cool air outlet and an air flow path therethrough from said warm air inlet to said cool air outlet, cooling module fan means in said cooling module to establish air flow therethrough from said warm air inlet to said cool air outlet and heat exchange means in said cooling module in the air flow path therethrough, said cooling module being mounted in said cabinet means with its warm air inlet communicating with said warm air chamber and its cool air outlet communicating with said cool air chamber, and wherein said cabinet means is substantially closed so that air in said cabinet means is circulated from said cool air chamber through said power modules via the respective power module fan means and into said warm air chamber to cool said components and then from said warm air chamber through said cooling module via said cooling module fan means to cool the air for recirculation through said power module.

2. The power supply set forth in claim 1 wherein said cabinet means has access openings to said warm air and cool air chambers and closure means closing said access openings.

3. The power supply set forth in claim 2 wherein said cool air chamber and said warm air chamber are substantially at atmospheric pressure when said cabinet is closed and said fan means are operating.

4. The power supply set forth in claim 3 wherein said closure means and said access openings are sufficiently large so that said closures may be opened and said cooling module fan means may be disabled without reducing the air flow rate through said power modules when the power module fan means are operating.

5. The power supply set forth in claim 1 further comprising means for circulating cooling fluid through said heat exchanger means and cooling fluid piping connected to said heat exchanger means and adapted to be connected to a source of cooling fluid exterior of said cabinet means.

6. The power supply set forth in claim 1 wherein said cooling module fan means provides a predetermined air flow rate through said cooling module, and said fan means in each of said power modules is selected so that the sum of the air flow rate through all of said power modules is substantially equal to the predetermined air flow rate through the cooling module.

7. The power supply set forth in claim 1 wherein said power modules are stacked in said cabinet means in a substantially vertical column with all of said cool air inputs opening toward the front of said cabinet means and all of said warm air outlets opening toward the rear of said cabinet means so that air flows through said power modules in a substantially horizontal direction, and wherein said cooling module is also stacked in vertical alignment with said power module column with said warm air inlet opening toward the rear of said cabinet means and said cool air outlet opening toward the front of said cabinet so that air flow from said power modules to said cooling module and from said cooling module to said power modules is in a generally vertical direction.

8. The power supply set forth in claim 7 wherein each of said power modules and said cooling module has a generally rectangular transverse cross section and wherein the width of said cooling module is substantially equal to the width of said power module.

9. The power supply set forth in claim 1 wherein said power modules are stacked in a vertical column with said cool air inlets openings toward the front of said cabinet means and said warm air outlets opening toward the rear of said cabinet means, and wherein there is a plurality of cooling modules stacked in a second vertical column side by side to said power module column with each of said cooling modules having its cool air outlet opening toward the front of said cabinet means and its warm air inlet opening toward the rear of said cabinet means.

10. The power supply set forth in claim 9 wherein each of said power modules and each of said cooling modules has a substantially rectangular transverse cross section and wherein the height of each cooling module is substantially equal to the width of each power module.

11. The power supply set forth in claim 1 wherein there is a plurality of cooling modules arranged in a plurality of vertical columns with all cool air outlets of the cooling modules opening toward the front of said cabinet means and all of the warm air inlets opening toward the rear of said cabinet means, said power modules are arranged in a plurality of vertical columns with all cool air inlets of the power modules opening toward the front of said cabinet means and all of the warm air outlets opening toward the rear of said cabinet means, and wherein said power module columns and cooling module columns are arranged in an alternating series with a front portion of said cabinet means forming said common cool air chamber for all the modules and a rear portion of said cabinet means forming said common warm air chamber for all of said modules.

12. The power supply set forth in claim 1 wherein there is a plurality of cooling modules, said power modules and said cooling modules are stacked in said cabinet means in side-by-side vertical columns with each column containing at least one power module and at least one cooling module, said warm air outlets of said power modules and said warm air inlets of said cooling modules communicate with said common warm air chamber of said cabinet means and wherein said cool air inlets of said power modules and said cool air outlets of said cooling modules communicate with said common cool air chamber of said cabinet means.

13. The power supply set forth in claim 1 wherein said power modules and said cooling module have a substantially rectangular transverse cross section and at least one of the transverse dimensions of said cooling module is equal to at least one of the transverse dimensions of said power modules.

14. The power supply set forth in claim 13 wherein the transverse cross section dimensions of said cooling module are substantially equal to the transverse cross section dimensions of said power modules.

15. The power supply set forth in claim 1 wherein each power module comprises a housing substantially closed except for said cool air inlet and said warm air outlet so that the air flow path therethrough is substantially confined, said power module fan means is located inside said housing immediately adjacent said warm air outlet, and wherein said power module fan means is constructed so that a negative pressure zone developed by said power module fan means is substantially confined within said housing.

16. The power supply set forth in claim 15 wherein said power module fan means have propeller-type blades.

17. The power supply set forth in claim 1 wherein said cooling module comprises a housing substantially closed except for said warm air inlet and said cool air outlet so that the air flow path therethrough is substantially confined, said cooling module fan means is located inside said housing immediately adjacent said cool air outlet and wherein said cooling module fan means is constructed so that a negative pressure zone developed by said cooling module fan means is substantially confined within said housing.

18. The cooling system set forth in claim 17 wherein said cooling module fan means have propeller-type blades.

19. The power supply set forth in claim 1 wherein said cabinet means has a separate control component chamber having a cool air inlet communicating with said cool air chamber and a warm air outlet communicating with said warm air chamber, and fan means in said control component chamber to circulate air from said cool air chamber through said control component chamber and into said warm air chamber.

20. The power supply set forth in claim 1 wherein there is a plurality of cooling modules and wherein the ratio of power modules to cooling modules is in the range of from two power modules for each cooling module to three power modules for each cooling module.

21. The power supply set forth in claim 1 wherein there is a plurality of cooling modules each of which has a cooling module fan means and wherein said cooling module fan means provides a total air flow rate through said cooling modules that is substantially the same as a total air flow rate through said power modules provided by said power module fan means.

22. A cooling system for use with a modularized power system wherein each of a plurality of power modules includes at least either a transformer component or a rectifier component cooled by fan means in each power module and wherein the fan means in each module is constructed to provide adequate cooling of components in each module, comprising an exterior housing, said power modules being mounted inside said housing, a plurality of cooling modules mounted inside said housing, a cool air chamber in said housing communicating with cool air inlets to said power modules and with cool air outlets of said cooling modules, a warm air chamber in said housing communicating with warm air outlets of said power modules and with warm air inlets of said cooling modules, and wherein said cooling modules each have fan means therein selected to provide a predetermined air flow rate through said cooling modules such that a collective air flow rate through all of said cooling modules is approximately equal to a collective air flow rate through all of said power modules when said power module fan means and cooling module fan means are operating.

23. The cooling system set forth in claim 22 wherein the ratio of power modules to cooling modules is in the range of from two power modules for each cooling module to three power modules for each cooling module.

24. A power supply for converting alternating current to direct current comprising a plurality of power modules each of which has a cool air inlet, a warm air outlet and power module fan means to establish air flow therethrough along an air flow path from said inlet to said outlet, respective transformer means and rectifier means mounted in each power module so as to be disposed in said air flow path therethrough, a plurality of cooling modules each of which has a warm air inlet, a cool air outlet and cooling modules fan means to establish air flow therethrough along an air flow path from said warm air inlet to said cool air outlet, respective heat exchanger means in each cooling module in said air flow path therethrough, said cooling modules being disposed adjacent said power modules, means defining a cool air chamber communicating with said cool air inlets and said cool air outlets to conduct cool air from said cool air outlets to said cool air inlets, and means defining a warm air chamber communicating with said warm air outlets and said warm air inlets to conduct air from said warm air outlets to said warm air inlets whereby air is circulated from said cool air chamber through respective power modules to said warm air chamber by respective power module fan means and from said warm air chamber through respective cooling modules to said cool air chamber by respective cooling module fan means.

25. A power supply for converting alternating current to direct current comprising a plurality of power modules each of which includes at least a transformer component and a rectifier component, exterior cabinet means and a plurality of cooling modules, each of said power modules having a cool air inlet, a warm air outlet and power module fan means to establish air flow therethrough along a path from said inlet to said outlet, said components being disposed in said air flow path of their respective power module, and said power modules being mounted in said cabinet means aligned with each other so that said inlets communicate with a common cool air chamber in said cabinet means, said outlets communicate with a common warm air chamber in said cabinet means, and said air flow paths in said power modules are generally parallel to each other, and wherein said cooling modules have a warm air inlet, a cool air outlet and cooling module fan means to establish air flow therethrough along a path from said warm air inlet to said cool air outlet, and respective heat exchanger means in each cooling module disposed in the air flow path through its respective module, and wherein said cooling modules are mounted in said cabinet means with said warm air inlets communicating with said warm air chamber, said cool air outlets communicating with said cool air chamber, and said air flow paths through said cooling modules generally parallel to each other.

26. The power supply set forth in claim 25 wherein said power modules are stacked in vertical alignment with each other in a first row so that air flows through said power modules in a first generally horizontal direction, said cooling modules are also stacked in vertical alignment with each other in a second row so that air flows through said cooling modules in substantially a second generally horizontal direction opposite to said first horizontal direction, and wherein said first and second rows of modules are in vertical alignment with each other so that air flows through said warm air chamber in one generally vertical direction and through said cool air chamber in an opposite generally vertical direction.

27. The power supply set forth in claim 25 wherein said power modules are stacked in vertical alignment with each other in a first row so that air flows through said power modules in a first generally horizontal direction, said cooling modules are also stacked in vertical alignment with each other in a second row so that air flows through said cooling modules in a second generally horizontal direction opposite to said first horizontal direction, and wherein said first and second rows of modules are side by side to each other so that air flows through said warm air chamber in a third generally horizontal direction generally perpendicular to said first and second horizontal directions and air flows in said cool air chamber in a fourth generally horizontal direction opposite to said third horizontal direction.

* * * * *

PO-1050
(5/69)

UNITED STATES PATENT OFFICE
CERTIFICATE OF CORRECTION

Patent No. 3,749,981 Dated July 31, 1973

Inventor(s) MICHAEL A. KOLTUNIAK, THOMAS N. URQUHART & LEO L. CASE

It is certified that error appears in the above-identified patent and that said Letters Patent are hereby corrected as shown below:

Column 1, lines 4 and 5, delete "our copending"; line 7, before the period (.) insert --(now abandoned)--; lines 8-11, delete "Copending applications Ser. No. 9,294, filed Feb. 6, 1970, entitled 'Modular Alternating to Direct Current Converter,' and Ser. No. 9,331, filed Feb. 6, 1970, entitled 'Modular Power Supply,'" and insert --United States Patent Nos. 3,586,915, granted June 22, 1971, entitled "Modular Alternating to Direct Current Converter with Extruded Corner Housing Portions", and 3,641,419, granted February 8, 1972, entitled "Modular Power Supply with Plural Rectifier Housings Each of Which Contains Rectifying Devices, a Transformer and Fan Means",--. Line 21, delete "copending applications" and insert --United States patents--; line 31, after "rectifier" insert --heat--.

Column 2, line 63, after "FIG." delete "2" and insert --1--.

Column 4, line 67, delete "into" (second occurrence).

Column 5, line 1, delete "the warm air"; line 13, delete "copending applications" and insert --United States patents--; line 15, delete "70" and insert --74--; line 38, delete "6" and insert --5--; line 63, delete "copending applications" and insert --United States patents--.

Column 6, line 15, "bee" should be --be--; line 26, "built" should be --build--; line 46, "26" should be --16--; line 52, "26" should be --16--.

(cont.)

PO-1050
(5/69)

UNITED STATES PATENT OFFICE
CERTIFICATE OF CORRECTION

Patent No. 3,749,981 Dated July 31, 1973

Inventor(s) MICHAEL A. KOLTUNIAK, THOMAS N. URQUHART & LEO L. CASE

It is certified that error appears in the above-identified patent and that said Letters Patent are hereby corrected as shown below:

Column 7, line 6, "124" should be --124'--; line 27, "24" should be --44--.

Column 9, line 38, "enclosing" should be --enclosure--.

Column 10, line 40, "module" should be --modules--.

Column 13, line 28, "exchanger" should be --exchange--.

Signed and sealed this 18th day of December 1973.

(SEAL)
Attest:

EDWARD M. FLETCHER, JR.
Attesting Officer

RENE D. TEGTMEYER
Acting Commissioner of Patents